H. FOUASSE.
DEVIATOR FOR RANGE FINDERS.
APPLICATION FILED APR. 16, 1919.
1,370,530.
Patented Mar. 8, 1921.
2 SHEETS—SHEET 1.
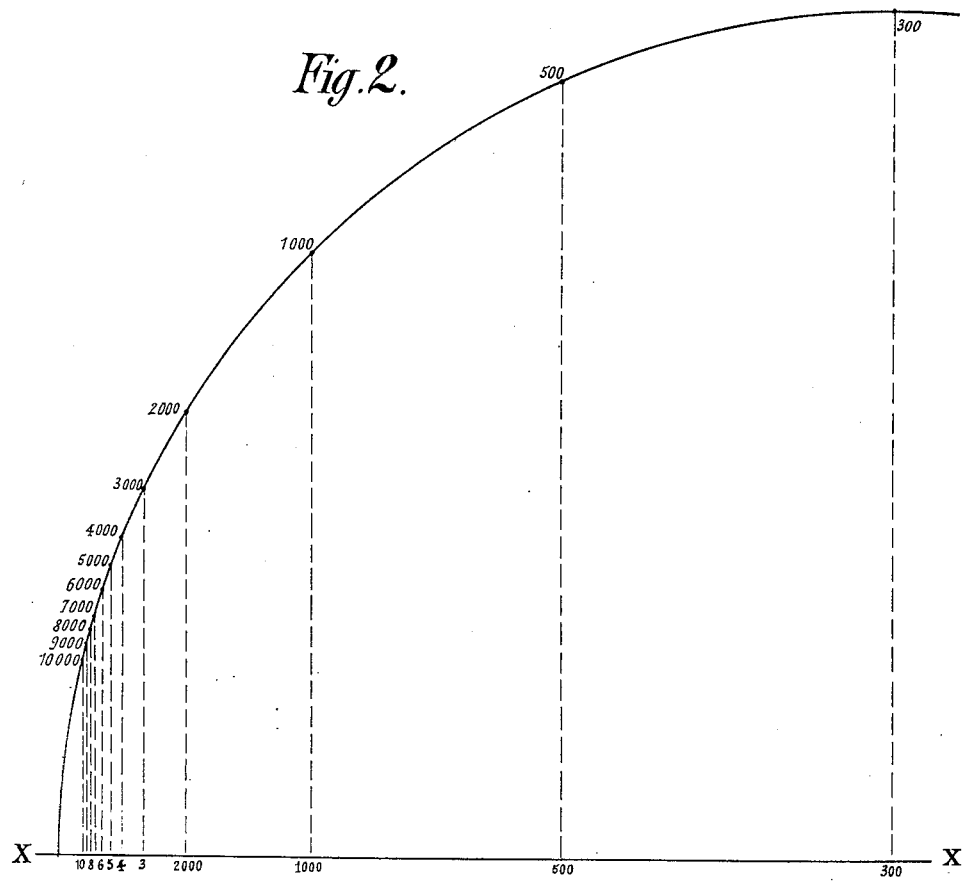
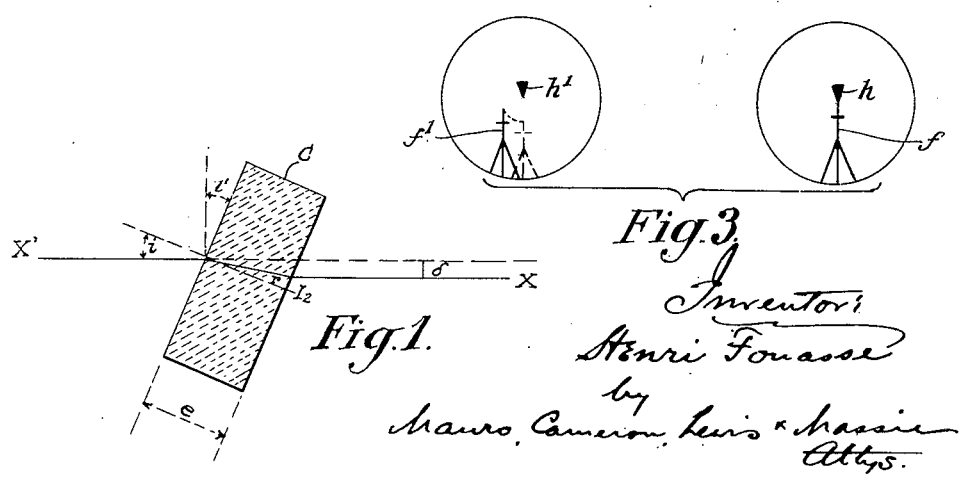

H. FOUASSE.
DEVIATOR FOR RANGE FINDERS.
APPLICATION FILED APR. 16, 1919.
1,370,530.
Patented Mar. 8, 1921.
2 SHEETS—SHEET 2.
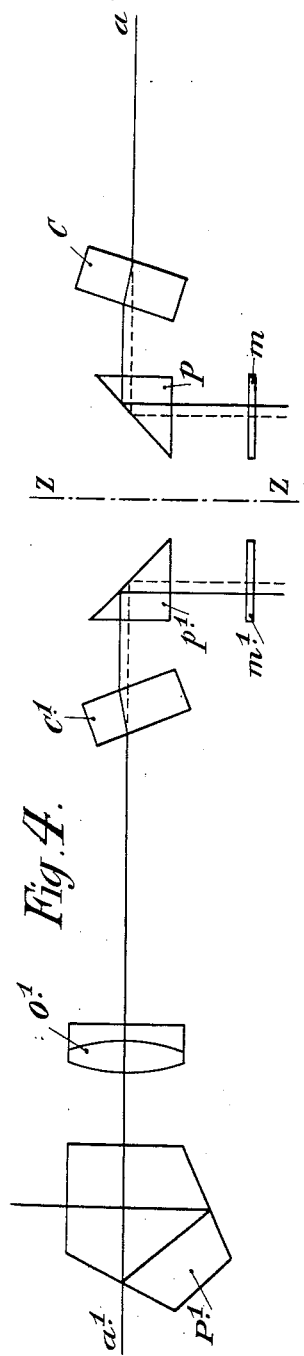
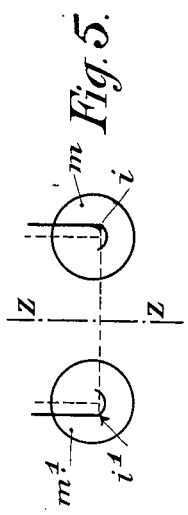
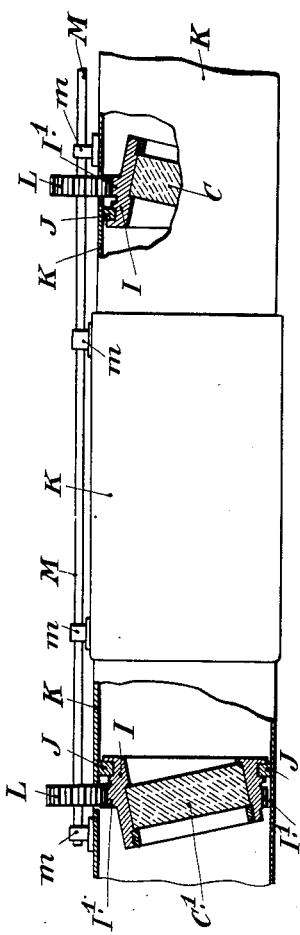

UNITED STATES PATENT OFFICE.

HENRI FOUASSE, OF PARIS, FRANCE, ASSIGNOR TO SOCIETE D'OPTIQUE ET DE MECANIQUE DE HAUTE PRECISION, OF PARIS, FRANCE, A JOINT-STOCK COMPANY OF FRANCE.

DEVIATOR FOR RANGE-FINDERS.

1,370,530.  Specification of Letters Patent.  Patented Mar. 8, 1921.

Application filed April 16, 1919. Serial No. 290,589.

*To all whom it may concern:*

Be it known that I, HENRI FOUASSE, citizen of the French Republic, and resident of 125 Boulevard Davout, Paris, France, have invented new and useful Improved Deviators for Range-Finders, which invention is fully set forth in the following specification.

In range-finders, the "deviator" is that device which serves for producing the displacement of one of the images of the observed object relatively to the other image of the same object.

In range-finders operating on the coincidence principle, this displacement is intended to cancel the parallax of the images of the object. In stereoscopic range-finders this displacement is intended to give an exactly determined value to the said parallax.

In both cases, a scale closely connected to the deviator, enables the distances of the sighted objects to be read off.

The distance of these objects is as a matter of fact a function of the parallax of their images. The canceling of this parallax is produced by an exactly determined movement of the deviator.

In prism deviators using longitudinally movable single prisms, it is very difficult to impart to the prism a translation movement which is not complicated more or less by inconvenient rotational movements. The prism also disperses the light, thereby impairing the sharpness of definition of the images. If recourse is had to remedy this drawback by making the prisms achromatic, this leads to a very delicate construction. Further, the divisions indicating on the scale the distances or ranges that are proportional to the parallaxes are very close together toward the corresponding end for long ranges.

Deviators of the rotary type using a combination of juxtaposed prisms movable about a common axis through equal amounts in opposite directions prevents dispersion effects as in the case of single prisms, and the scale divisions for longest ranges are even closer together than in the preceding arrangement.

In order that the invention may be more readily understood reference is had to the accompanying drawings in which:

Figure 1 is an explanatory diagrammatic view showing a plane-parallel glass plate for use in a deviator;

Fig. 2 is a diagrammatic view showing the relation of straight and curved scales;

Fig. 3 is a diagrammatic view showing fields of vision in a stereoscopic range finder;

Fig. 4 is a diagrammatic view showing a range finder embodying the principles of my invention;

Fig. 5 is a diagrammatic plan view showing two micrometers used in the device; and Fig. 6 is a view partly in side elevation and partly broken away showing means for simultaneously rotating the deviators.

The improved deviator forming the subject matter of the present invention remedies to a great extent all those drawbacks. With this object, it consists as shown in diagrammatic view in Fig. 1 of a plano-parallel glass plate C capable of being rotated around the axis $a^1$—$a$ of the instrument, to which it is inclined at an angle $i$.

Under these conditions, each point of the image describes a circumference having a radius R, so that we get:

$$R = e \sin i \left( I - \frac{\cos i}{\sqrt{n^2 - \sin^2 i}} \right)$$

$e$ being the thickness of the plate, and $n$ its refractive index.

Referring to the explanatory diagram Fig. 1, let $e$=the thickness of the plate; $n$=the index of refraction of the plate; $i$=angle of incidence; $r$=angle of refraction; and $\delta$= lateral deviation of the ray.

Ther $$e = I_1 I_2 \cos r$$

$$\delta = I_1 I_2 \sin (i - r)$$

$$\delta = \frac{e \sin (i - r)}{\cos r} = \frac{e (\sin i \cos r - \sin r \cos i)}{\cos r}$$

factoring and noting that $\sin r = \frac{1}{n} \sin i$, $$(1) \quad \delta = e \sin i \left( 1 - \frac{\frac{1}{n} \cos i}{\cos r} \right).$$

But $\cos r = \sqrt{1 - \sin^2 r} = \sqrt{1 - \frac{\sin^2 i}{n^2}}$ substituting in (1) and eliminating $n$ $$\delta = e \sin i \left( 1 - \frac{\cos i}{\sqrt{n^2 - \sin^2 i}} \right) = A$$

If now the system is turned around incident ray $X^1I$, the emergent ray describes a cylindrical ray with a radius $R=A=\delta$.

In this construction, $\omega$ being the angle of rotation, the deviation will be proportionate to $(1-\cos \omega)$. That is to say, for one and the same value of the parallax, the glass plate C will have to be rotated through an angle that increases according to the distance of the object being sighted. Consequently the divisions of the scale will be widely spaced apart in the case of far distant objects, thus rendering the construction and the use of the instrument much more easy.

The diagram of Fig. 2 shows clearly the advantage which the use of the improved deviator of the present invention affords compared with the use of the known deviating prism.

The spaces between the divisions of the scale which, in the prism deviator, would be marked along a straight line X—X as indicated in the diagram, would, all other things being equal, be represented in the improved apparatus by the projections of the same distance on to an arc of a circle of a radius approximately equal to the length of the scale.

Nevertheless the deviator constructed in this manner would have a serious drawback. A vertical difference would be produced between the two images. For instance, on considering the telescopic range-finder (the same reasonings apply to the other cases):

As indicated in the diagram of Fig. 3, let $f^1$ designate in the left hand field of vision, the image of a belfry whose spire gives in the right hand field of vision an image coinciding with the register mark $h$. By rotating the deviator the image can be brought into a vertical line with $h^1$, but with a displacement equal to $\sin \omega$, taking the parallax as unity; such a displacement will render it almost impossible to produce a correct stereoscopic image.

Now, according to the present invention, this drawback can be remedied by providing two identically similar deviators arranged symmetrically in relation to the plane at right angles to the axis, passing through the center of the apparatus. This construction is illustrated diagrammatically in Fig. 4.

In this figure, P and $p^1$ are right-angled triangular prisms. $O^1$ is one of the objectives comprised in the usual range-finders, the companion objective not being shown.

The improved apparatus comprises two identically similar deviating glass plates C and $C^1$ movable around the longitudinal axis $a$—$a^1$ and arranged symmetrically in relation to the plane of the transverse axis Z—Z. Rectifying or uprighting devices $p$ and $p^1$ of known construction illustrated in diagram, are provided for the purpose of reflecting the deviated images into two micrometers $m$ and $m^1$ which are shown in plan in Fig. 5.

Two points $i$, $i^1$ of the two images corresponding to one and the same point of the sighted object, will remain always on one and the same horizontal line irrespectively of the position of the deviators (the longitudinal axis of the apparatus is of course assumed to be horizontal in the drawing). Therefore there will be no vertical difference between the two images.

On the other hand the two deviators C and $C^1$ share the work. The resulting slight dispersion (less than with the prism) and the introduced astigmatism are much less than in the case of a prismatic deviator. On the other hand, they act upon the two images, which is not the case with the prism that produces an actual absence of equilibrium.

The distance between $C^1$ and C is immaterial; this facilitates the construction and avoids a source of error.

In the case of prism apparatus the distance from the image is strictly determined; it is either fixed (diasporometer), or it is a function of the parallax (movable prism).

The mechanism for causing the rotation of the glass plate C, $C^1$ around the longitudinal axis of the apparatus may be of any desired type. For instance the mechanism shown in Fig. 6 may be employed.

The mount I of each glass plate is guided by means of an annular groove, with, if necessary, the interposition of rollers or balls, in a ring J fixed in the tube K at right angles to the axis of the latter. The said mount carries externally a ring of teeth $I^1$ meshing with a pinion L mounted on a shaft M parallel to the axis of rotation of the glass plates C $C^1$ and journaled in bearings $m$ carried by the tube K. The actuation of the shaft M may be effected by any suitable device, such as a handle, knob, knurled wheel or other means.

What I claim is:—

In a range finder in which two reflecting surfaces are located at opposite ends of a base line, each surface being adapted to receive and reflect rays from the distant object, a deviator comprising two plano-parallel glass plates being equally and oppositely inclined to the longitudinal axis of the apparatus and through one of which passes the rays reflected at one end of said base line and through the other passes rays reflected from the opposite end of said base line, mountings for said plates symmetrically disposed in respect to a plane at right angles to the said axis, and means for simultaneously rotating said plates in the same direction.

In testimony whereof I have signed this specification.

HENRI FOUASSE.